(12) United States Patent
Kerwin

(10) Patent No.: US 7,589,327 B2
(45) Date of Patent: Sep. 15, 2009

(54) ENERGY SENSITIVE DIRECT CONVERSION RADIATION DETECTOR

(75) Inventor: David B. Kerwin, Colorado Springs, CO (US)

(73) Assignee: Aeroflex Colorado Springs Inc., Colorado Springs, CO (US)

(*) Notice: Subject to any disclaimer, the term of this patent is extended or adjusted under 35 U.S.C. 154(b) by 0 days.

(21) Appl. No.: 12/121,480

(22) Filed: May 15, 2008

(65) Prior Publication Data

US 2008/0283764 A1    Nov. 20, 2008

Related U.S. Application Data

(60) Provisional application No. 60/938,114, filed on May 15, 2007.

(51) Int. Cl.
*H01J 47/00* (2006.01)
(52) U.S. Cl. .................................. 250/389
(58) Field of Classification Search ............. 250/389
See application file for complete search history.

(56) References Cited

U.S. PATENT DOCUMENTS

| | | | |
|---|---|---|---|
| 2,445,305 A * | 7/1948 | Hochgesang | 250/266 |
| 5,635,706 A | 6/1997 | She et al. | |
| 6,037,595 A | 3/2000 | Lingren | |
| 6,891,166 B2 | 5/2005 | Brahme et al. | |
| 7,127,027 B2 | 10/2006 | Hoffman | |
| 2007/0036512 A1 | 2/2007 | Winston et al. | |

* cited by examiner

*Primary Examiner*—David P Porta
*Assistant Examiner*—Marcus H Taningco
(74) *Attorney, Agent, or Firm*—Michael C. Martensen; William J. Kubida; Hogan & Hartson LLP

(57) ABSTRACT

An x-ray detector capable of directly converting x-ray radiation into electrical signals utilizes the radiation induced conductivity of various solid, electrically insulating materials. The detector is configured comprising one or more anodes and cathodes separated by various thicknesses of dielectric material wherein ionization occurs primarily in the electrodes of such detector structure. The radiation induced conductivity of the dielectric material can be modulated by controlling the size, orientation and composition of the electrodes and the dielectric materials as well as the electrical bias between anode and cathode.

24 Claims, 3 Drawing Sheets

ENERGY SENSITIVE DIRECT CONVERSION RADIATION DETECTOR

RELATED APPLICATION

The present application relates to and claims the benefit of priority to U.S. Provisional Patent Application No. 60/938,114 filed May 15, 2007, which is hereby incorporated by reference in its entirety for all purposes as if fully set forth herein.

BACKGROUND OF THE INVENTION

1. Field of the Invention

Embodiments of the present invention relate, in general, to radiation detection and particularly to direct conversion x-ray detectors which have embedded electrodes of various composition and use radiation-induced conductivity found in various solid, dielectric materials.

2. Relevant Background

Radiation detectors are used for detection of incoming radiation, such as x-rays, gamma photons and charged/uncharged particles, in a wide range of different applications. For direct detection of photons of various energies, the incoming photons ionize the material of which the detector is made, releasing energetic electrons through interactions such as the photoelectric effect, pair production and the Compton effect. The emitted electrons also cause additional ionization in proportion to the energy of such electrons, which in turn may be detected by a suitable device.

Typically, in radiographic imaging systems, an x-ray source emits x-rays toward a subject or object, such as a patient or a piece of luggage. The beam, after being attenuated by the subject or object, impinges upon an array of radiation detectors wherein the intensity of the attenuated radiation beam received at the detector array is detected. Each detector element of the detector array produces a separate electrical signal indicative of the attenuated beam received by each detector element which is thereafter transmitted to a data processing system for analysis, ultimately producing an image.

X-ray detectors typically include a collimator for excluding scattered radiation that might be received at the detector, a scintillator adjacent to the collimator for converting x-rays to light energy and a photodiode for receiving the light energy from an adjacent scintillator and producing electrical signals therefrom. In this type of detector, the x-ray energy absorbed by the scintillating material is converted to visible photons which are then directed into a silicon photodiode. The outputs of these photodiodes are converted into digital data by means of various amplifiers followed by analog-to-digital converters and then transmitted to the data processing system for image reconstruction.

A drawback to this indirect approach to x-ray detection is the fact that it is a two step process to convert x-rays into electrical signals that can be further processed for applications such as computed tomography or digital radiography. Also, detectors using scintillator material suffer from the fact that such materials possess memory effects. Visible light that enters a scintillator based detector promptly decays after the cessation of irradiation by x-rays. However this decay is followed by an afterglow effect that may persist for tens of milliseconds. Another drawback of indirect detection is optical cross-talk between two or more detector elements in close proximity. The scintillator material is typically glued to the photodiode array using an optically transparent adhesive. This adhesive is of a finite thickness, thus allowing light, within a certain angle of incidence with respect to the exit plane of the scintillator exiting a certain distance from the edge of such scintillator, to enter the adjacent detector element. This effect can be minimized by making the adhesive as thin as possible, but the integrity of the bond between scintillator and photodiode degrades with a thinner adhesive. Typically, this optical cross-talk effect is the dominant crosstalk mechanism in indirect x-ray detectors.

The direct conversion of x-rays into electrical signals is well known and often employed for dosage and exposure measurement. X-ray detection of this type has two main advantages over the scintillator-photodiode approach mentioned above. First, there is a much quicker decay in the electrical signal after the cessation of irradiation by x-ray energy. Thus the afterglow effect associated with scintillator material is greatly reduced. Secondly, there is simply no need for scintillator material thereby removing the cost of the scintillating material and the cost of assembling such scintillating material into the detector array.

One method for converting x-rays directly into an electrical current is through the use of ion-chambers. Ion-chambers may be constructed by positioning two parallel flat electrode plates a constant distance apart. The plates are typically enclosed in a chamber constructed of a dielectric material such as Plexiglas. The chamber is sealed and filled with an inert gas such as argon or xenon. X-rays are directed in one end of the chamber such that the x-rays pass through the volume of gas between the two parallel plates. The plates are electrically biased so as to create a substantial electrostatic field between the plates. The ionization of the gas by the x-rays in the presence of a large electric field leads to an electric current proportional to the x-ray energy absorbed by the gas. For a constant x-ray energy, the signal may be said to be proportional to the flux of x-ray photons. One of the most significant drawbacks to gas filled ion-chambers is poor x-ray absorption efficiency. Even using chambers filled with xenon gas at high pressure, the absorption efficiency per unit length through such an ion-chamber is poor compared with the scintillator-photodiode approach. Thus ion-chamber detectors are rarely used as x-ray detectors for any type of imaging.

The ion chamber described above is a specific instance of a detector that relies on the radiation induced conductivity of a material that is electrically insulating in the absence of a radiation field. In the case of the ion chamber, the insulating material is a gas, and the presence of a radiation field in the gas lowers the effective electrical resistivity of the gas such that the application of an external electric field causes a significant electrical current to pass through the gas. Others (such as deGaston, U.S. Pat. No. 4,135,090) have used hydrocarbon liquids as the normally insulating material, producing a radiation detector that has similar absorption properties to soft tissue, but is not sensitive to the energy of the detected x-ray.

Another promising direct conversion method in x-ray detection is the use of compound semiconductors composed of materials that have a significantly higher atomic number than silicon. One such material is cadmium zinc telluride ("CZT"). While CZT detectors hold promise, the quality and expense of grown CZT crystals has so far prevented CZT from being used in mainstream x-ray detection.

Whether indirect or direct conversion is used, it is desirable to have not only a measure of the attenuation of the x-rays through a patient or object being imaged, but also a measure of the energy of the x-rays that are not absorbed by the patient or object. This is desirable for determining the composition of the material in the patient or object. This has been accomplished in several ways: 1) The x-ray source energy may be modulated and detector signals recorded for the various x-ray generator tube energies, 2) some portion of the detector array can be masked with a filter that absorbs lower energy x-rays such that the underlying detector of that portion of the detector array responds only to some higher energy portion of the transmitted x-rays, or 3) the detector can be operated in a mode whereby individual x-ray photon events are counted and the size of the respective current pulses produced by a single x-ray photon being absorbed are quantified.

Each such method has its drawbacks. In the case of modulating the x-ray generator tube (method 1 above), the patient or object must receive a higher dose of irradiation, since the detection is done at two different exposures. In the case of masking a portion of the detector array (method 2 above), x-ray energy is needlessly wasted (i.e. not converted into signal) in a portion of the detector. This shortcoming has been minimized by using an entire detector, itself, as the filter such that simultaneous low and high energy signals are created (e.g. by stacking one detector upon another). In the case of photon counting (method 3 above), one must decrease the size of a detection element such that the number of incident x-ray photons per unit time is small enough that one can count the current pulse produced by an x-ray photon without multiple pulses "piling up", causing the detector electronics to incorrectly classify both the number and the energy of the x-ray photons.

SUMMARY OF THE INVENTION

Briefly stated, embodiments of the present invention involve direct conversion of x-ray radiation to electrical current(s) utilizing the radiation induced conductivity ("RIC") effect in solid insulating materials, wherein the detailed geometry of the electrodes employed in the detector both enhances the ionization produced in the detector and provides for energy sensitivity in the signal(s). In one embodiment of the present invention, a direct conversion x-ray detector is configured comprising one or more anodes and cathodes separated by differing thicknesses of dielectric material. Departing from the operating theory of gas filled ion-chambers and direct conversion semiconductors, the present invention enables x-ray absorption to occur primarily by the electrodes themselves rather than the material between the electrodes (unlike CZT and other photoconductors comprised of elements with high atomic numbers).

According to one embodiment of the present invention, ionization occurs in the dielectric material positioned between the electrodes from energetic photoelectrons. This is the result of the energetic photo- or Compton electrons produced by the primary x-ray interaction in the electrode. By controlling detector characteristics such as choice and thickness of electrode material, placement and geometry of the anode with respect to the cathode (electrodes) and choice of the dielectric material found between the electrodes, the present invention can achieve nearly 100% absorption of incident x-rays with the additional benefit of producing signals within a detector element that are energy sensitive. Unlike photon counting energy sensitive methods, the size of the detector element used in the present invention is not limited. According to one embodiment of the present invention and unlike filtration methods, even such filtration methods wherein stacked detectors are employed, no x-ray signal is lost due to absorption in materials used in the stacked detector array whose function is purely mechanical (e.g. substrates between various detector elements). In addition, the energy sensitivity of the present invention does not depend upon modulation of the x-ray generator tube energy.

The features and advantages described in this disclosure and in the following detailed description are not all-inclusive, and particularly, many additional features and advantages will be apparent to one of ordinary skill in the relevant art in view of the drawings, specification and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

Figures 1, 2:
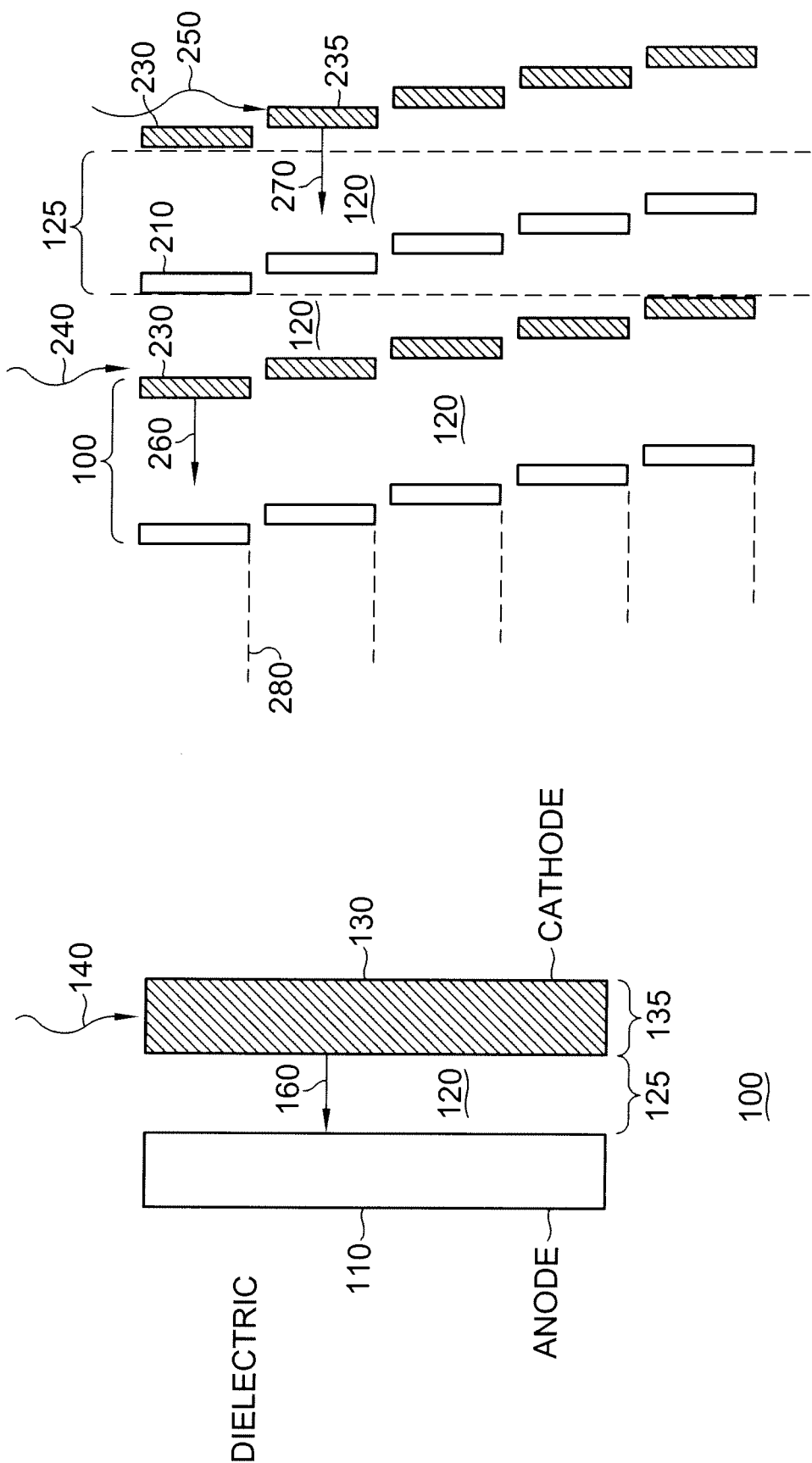
FIG. 1 shows a direct conversion x-ray detector according to one embodiment of the present invention.
FIG. 2 shows a plurality of direct conversion x-ray detectors configured to detect x-ray radiation across a range of energies according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

FIG. 1 shows a direct conversion x-ray detector 100, according to one embodiment of the present invention, configured utilizing parallel plates as electrodes wherein one plate is an anode 110 and the other is a cathode 130. These two electrodes are separated by a dielectric material 120. This design is similar to some types of gas-filled ion-chambers and other direct conversion semiconductor detectors; however, the present invention differs in that the most significant portion of x-ray absorption occurs in the electrodes themselves rather than in the dielectric material. Conversely, in semiconductor direct conversion x-ray detectors the absorption occurs between the electrodes in the semiconductor material such as CZT. In gas filled chamber x-ray detectors the absorption occurs in the gas molecules occupying the region between the electrodes.

The cathode 130 of the present invention is composed of a high atomic number material such as, but not limited to, tungsten. The anode 110 may be composed of the same such material, or a lower Z material such as, but not limited to, aluminum or copper. The volume between the two parallel plates (which may be of different sizes to minimize the effect of fringing electric fields) is filled with a dielectric material 120 such as, but not limited to, silicon dioxide or alumina. One skilled in the art will recognize that other materials possessing similar atomic numbers can be used without departing from the novelty of the present invention. Indeed the present invention contemplates a wide variety of combinations of material so as to achieve optimal conversion of x-ray radiation to electrical signals. It is well known that primary interaction of x-rays with matter in the energy range of 0 to 200 keV occurs generally in three processes: 1) coherent scattering, 2) photoelectric effect and 3) Compton scattering. Coherent scattering does not result in direct ionization at the scattering site and, accordingly, is ignored for the purposes of the present invention. Both photoelectric and Compton scattering produce energetic electrons originating at the site of the primary absorption/scattering event. It is also well known that the range of such energetic electrons is proportional to a power of the electron energy for sufficiently high electron energies. For the photoelectric effect, the electron energy is the difference between the x-ray photon energy and the K-, L-, or M-edge energy of the absorbing atom. For example, a 58 keV x-ray photon interacting with an atom of tungsten with an L-edge energy of approximately 10 keV will produce an energetic photoelectron having an energy of approximately 48 keV. This energetic photoelectron will produce further ionization in both the electrode (tungsten) and the dielectric material. Ionization in the dielectric material will promote electrons from the valence band of the dielectric material into the conduction band, leaving behind a positively charged hole in the valence band. Under the influence of a sufficiently high electric field, these charge carriers can be collected at the electrodes producing an electrical current proportional to the amount of ionization caused by the energetic photoelectron. Significantly, the thickness of the electrodes and the thickness of the dielectric material between anode and cathode can be configured to achieve nearly 100% absorption of incident x-ray radiation while producing signals within the detector proportional to the x-ray energies.

To determine the thickness of the cathode 130, anode 110 and dielectric material 120, an examination of x-ray radiation in the various material must be conducted. One measure of a material's ability to absorb x-ray energy is the continuous slowing down approximation ("CSDA") range. The CSDA range is a very close approximation to the average path length traveled by a charged particle as it slows down to rest. In this approximation, the rate of energy loss at every point along the track is assumed to be equal to the same as the total stopping power of the material through which the particle is traveling. Energy loss fluctuations are typically neglected. The CSDA range is obtained by integrating the reciprocal of the total stopping power with respect to energy. CSDA range equations for various materials can be derived from best fit data from selected stopping power data from the National Institute of Standards and Technology's ("NIST") Stopping Power and Range for Electrons program ("eSTAR"). This program and other information regarding CSDA can be found at http://www.physics.nist.gov and more specifically at http://physics.nist.gov/PhysRefData/Star/Text/ESTAR.html. The eSTAR program calculates stopping power, density effect parameters, range and radiation yield tables for energetic electrons in various materials.

In the case of tungsten, the CSDA range of energetic photoelectrons can be modeled by the following equation:

$$R = 0.0092\, E^{1.6105}$$

In this equation, R is the range in microns and E is the energy of the photoelectron in keV. Referring back to the previous example of a 58 keV incident x-ray, the 48 keV photoelectron that is the result of the x-ray's photoelectric interaction in tungsten has a range in tungsten of 4.7 microns. According to the geometry of the detector 100 with respect to an incident x-ray 140 shown in FIG. 1 and assuming that the cathode 130 is composed of tungsten, in order for an x-ray photon absorbed by the tungsten cathode to produce some ionization in the dielectric material, the cathode's thickness 135 must be significantly thinner than ~9.4 microns. This calculation takes into consideration the scenario in which the x-ray 140 is incident on the anode 110 at precisely the midpoint of the anode 110. By having a width no more than 9.4 microns, a photoelectron 160 normal to the plane of the cathode will escape the cathode 130. The same argument applied to the long axis of the cathode would suggest that the ideal cathode should be a cube (or even a sphere) with dimensions significantly less than 9.4 microns.

Likewise, the CSDA range of the photoelectron traveling through a dielectric material composed of alumina can be modeled by the following equation:

$$R = 0.016\, E^{1.7261}$$

Again, R is the range in microns and E is the energy of the photoelectron in keV. For a 58 keV incident x-ray 140 that is absorbed by a tungsten atom on the surface of the anode 110 facing the alumina dielectric, and assuming that the resulting photoelectron 160 is emitted normal to the surface of the anode 110, the maximum CSDA range in the alumina is 12.8 microns. Thus, for this energy of incident x-ray 140, the minimum dielectric thickness 125 should be no less than 12.8 microns to allow for maximum ionization in the dielectric material 120 (i.e. the shortest path across the dielectric is no less than the CSDA for that material). The actual optimum dielectric thickness will depend upon both the range of the electron of interest and the space charge region formed due to ionization in the dielectric for the electric field applied between anode and cathode. In another embodiment of the present invention, an anode 110 can be located on each side of the cathode 130.

FIG. 2 shows a plurality of direct conversion x-ray detectors configured to detect x-ray radiation across a range of energies according to one embodiment of the present invention. To assure maximum absorption of x-rays, multiple cathode-anode pairs 100 are staggered in the direction perpendicular to the incident x-rays 240, 250 as shown in FIG. 2. As incident x-rays 240, 250 enter the detector, the rays will either immediately strike an electrode 230 producing an energetic photoelectron 260 or be conveyed through the dielectric material 120 until they strike an offset electrode 235. Again, a photoelectron 270 will be generated and transverse the dielectric material 120 producing free carriers resulting in an electrical current. Depending on the width 135 of the electrodes 210, 230, as calculated above, and the width of the dielectric 125 several offset detectors 100 can be configured in a plurality of layers 280.

Another extension of embodiment 1 replaces the cathode material with tungsten (or the same material as the anode). As can be seen from FIG. 2, this would provide even better x-ray absorption with a smaller total detector thickness. As long as the energetic photoelectrons escape from the electrode in which they are produced, there will be ionization in the dielectric material despite the opposing electric field. It is important to remember that almost all of the signal current generated in this device results from the secondary electron-hole pairs created by the primary photoelectron or Compton electron. Making the cathode out of the same material as the anode 230 provides some manufacturing advantages as well.

Figure 3:
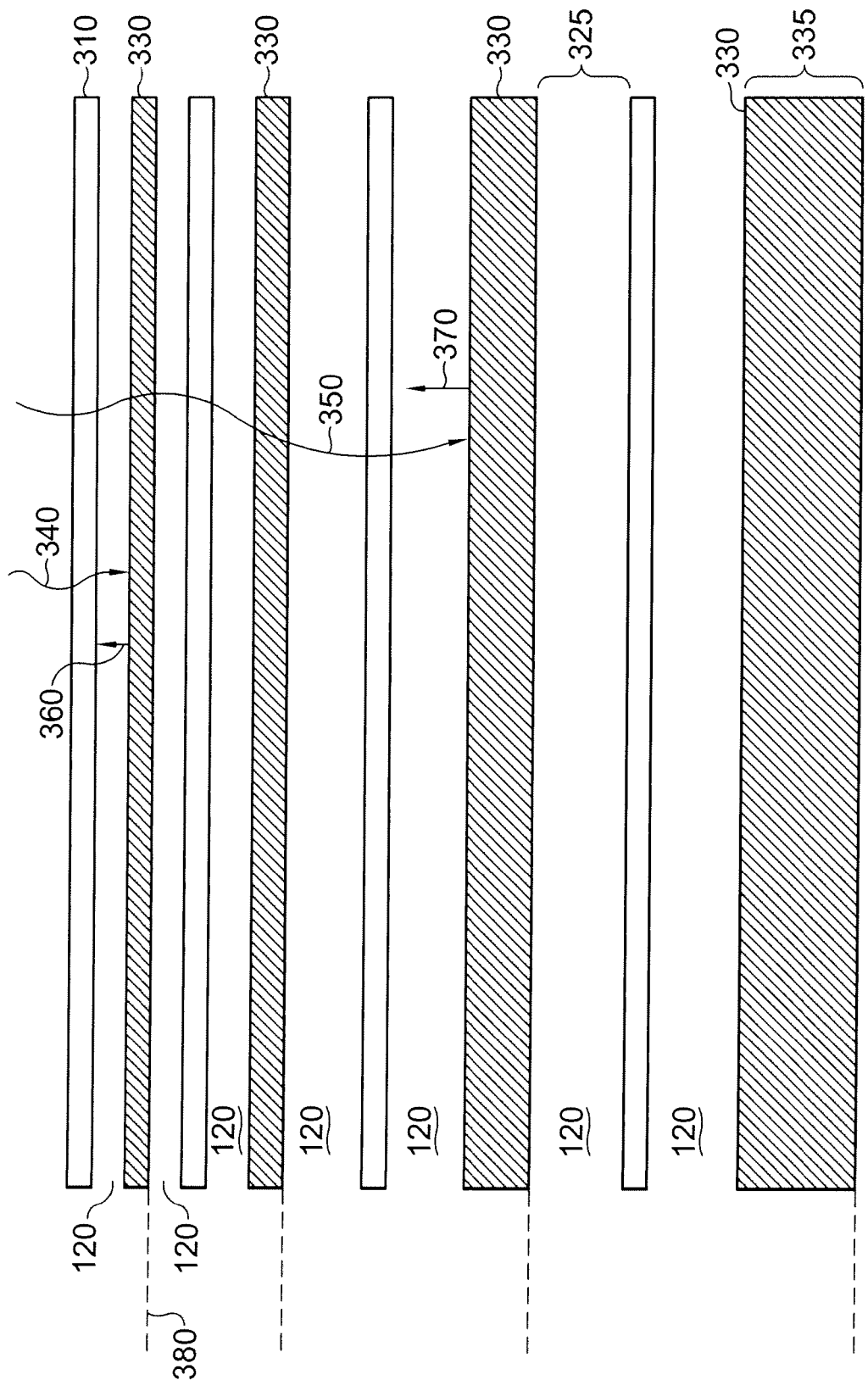
FIG. 3 shows a plurality of direct conversion x-ray detectors utilizing a planar configuration configured to detect x-ray radiation across a range of energies according to one embodiment of the present invention.

FIG. 3 shows another embodiment of the present invention comprising a plurality of direct conversion x-ray detectors utilizing a planar configuration. According to this embodiment, planar electrodes 310, 330 of the detector are orientated perpendicular to the incoming incident x-ray radiation. As the incident x-ray 340 penetrates the detector and interacts with an electrode 330 it again produces a photoelectron 360 that ionizes the dielectric material 120. As is apparent in FIG. 3, the width 335 of each cathode 330 increases with respect to each successive layer 380. Similarly, the width 325 of each septum (dielectric material) increases with each successive layer.

The configuration shown in FIG. 3 provides the additional capability of detecting and converting into electrical signals x-ray radiation possessing a range of energy levels. Assuming that the first cathode 330, anode 310 pair in FIG. 3 is configured optimally for the 56 keV x-ray of the previous example, and assuming all of the anodes 310 in FIG. 3 are composed of tungsten and the dielectric material is alumina, the width 335 of the first anode 310 should be no more than 9.4 microns with a corresponding width 325 of the dielectric material both above and below the anode 310 of no less than 12.8 microns. (see calculations previously described)

According to this embodiment of the present invention, x-rays of varied energies can be detected by the same detector and directly converted into electrical signals. An x-ray 350 of significantly higher energy than 56 keV will have a high probability of passing through the various layers 380 of the design shown in FIG. 3 until the combined thicknesses of the various layers 380 of electrodes 330 is such that the probability of absorption of the incident x-ray is high. The energetic photoelectrons 370 resulting from the interaction of the x-ray with the various cathodes 330 produce ionization in the various layers of dielectric material 120 creating a current realized at the various anodes 310. The various anodes 310 may be combined in parallel to drive a single signal, or separated into multiple signals representing different energy bins of the incoming x-ray beam. In this manner, a direct conversion detector can be created for detecting x-rays in a range of x-ray energy levels, with the number of energy bins (and the approximate range of energy covered by such bins) being determined by the number of layers.

The embodiment of the present invention shown in FIG. 3 possesses the additional benefit of ease of manufacturing. Specifically, this embodiment may be integrated into a CMOS, BiCMOS, or combination MEMS/CMOS process, in which case the detector electronics may be located immediately beneath the electrodes, providing a compact x-ray detector solution that may be implemented in a tile like fashion, wherein a larger detector array may be assembled by the two-dimensional tessellation of individual detector arrays.

Another embodiment of the present invention comprises filling the space between the electrodes with a dielectric material containing a heavy metal atom such as, but not limited to, lead, tellurium or gadolinium. Since the material between electrodes must have high resistivity at temperatures on the order of 0 to 100 degrees Celsius, one embodiment of the material is a glass consisting partly of oxides of such heavy metal elements. The addition of heavy metal atoms to the dielectric matrix provides for increased absorption of x-rays by the dielectric material. This increased absorption allows for a thinner total detector stack. In situations wherein the dielectric material can be made sufficiently absorbant, the need to have a high atomic number material for the electrode can be obviated. One must be cautious of introducing a dielectric material that has too high of an x-ray radiation stopping power since energetic photo- or Compton electrons that slow down in the dielectric material may escape the channel as electromagnetic radiation due to the Bremsstrahlung effect and either be lost to detection in the appropriate channel or be detected in a neighboring channel and thus be a source of cross-talk between channels. Also, such enhanced absorption glass must not be a scintillator, which would cause x-ray photons to generate visible light. Such visible light will not be detected since it does not have sufficient energy to ionize the dielectric material.

Figure 4:
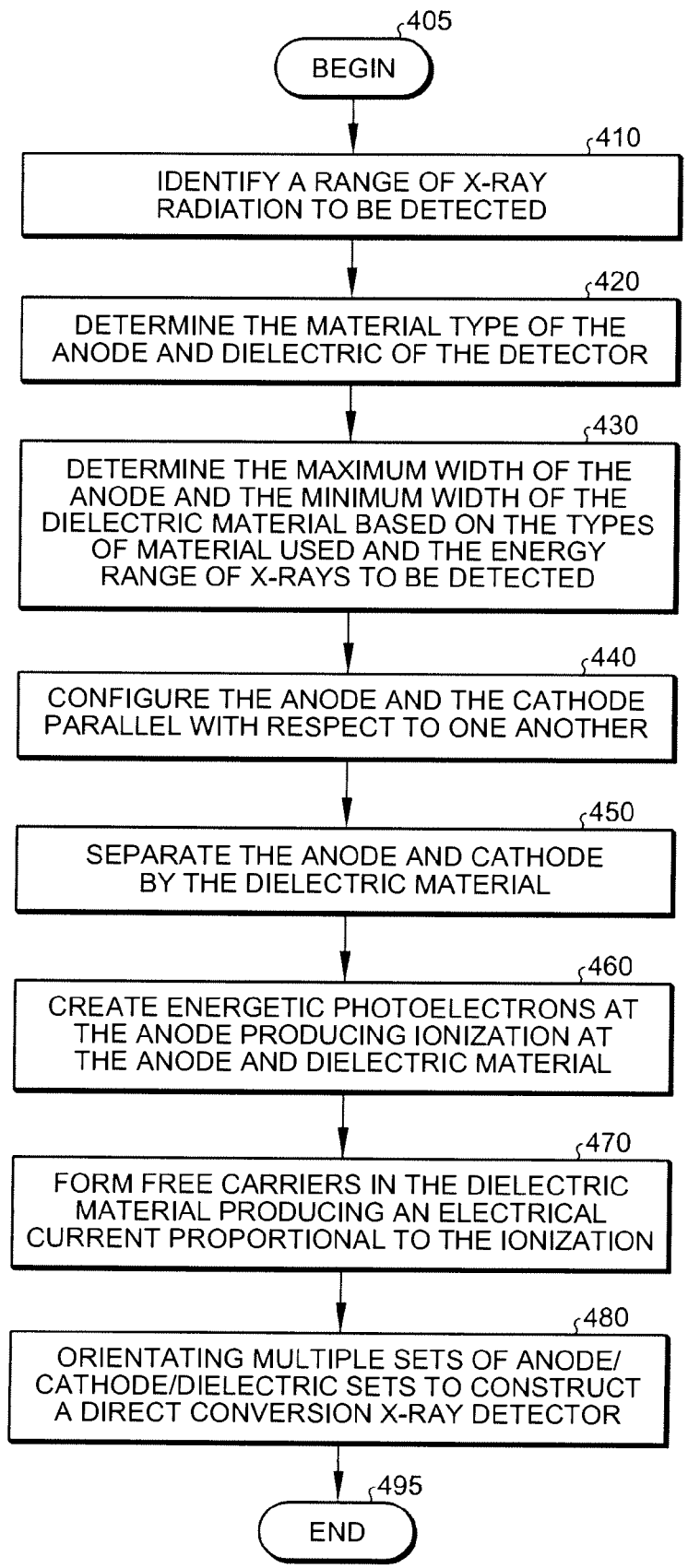
FIG. 4 is a flowchart of one method embodiment of the present invention to detect energy associated with x-ray radiation and directly convert that energy to electrical current.

FIG. 4 is a flowchart of one method embodiment of the present invention illustrating methods of implementing an exemplary process for detecting energy associated with x-ray radiation and directly converting that energy to electrical current. In the following description, it will be understood that each block of the flowchart illustration, and combinations of blocks in the flowchart illustration, can be implemented by computer program instructions. These computer program instructions may be loaded onto a computer or other programmable apparatus to produce a machine such that the instructions which execute on the computer or other programmable apparatus create the means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

The first step in converting x-ray radiation directly into electrical currents is to identify 410 the range of the energetic photo-, Compton, or pair-production particle(s) that will be generated for an x-ray of a particular energy. The particular range of energies of such particle(s) is of significant interest in configuring the present invention. Second, the type of material 420 must be determined. Typically, the cathode is composed of a material with an atomic number in excess of 26 such as gold or tungsten and the dielectric material is composed of a material having a sufficiently high band gap to have a low conductivity at temperatures at which the detector will be operated and maintain such low conductivity at the electrical biases that will be used during detector operation, but at the same time be susceptible to radiation induced conductivity.

Based on the particular energy range of the detector and the types of materials selected for the various components, a maximum thickness of the electrodes and a minimum width of the dielectric material separating the electrodes is determined 430. Thereafter the cathode and the anode are configured 440 so as to be substantially parallel with one another and separated 450 by the dielectric material.

Energetic photoelectrons are created 460 by the interaction of an x-ray of the particular energy range and the anode. The interaction of the photoelectron in the electrode and the dielectric material ionizes the dielectric material. The ionization produces 470 free carriers in the dielectric material creating an electrical current under the influence of the applied electrical potential between anode and cathode that is proportional to the particular energy of the electron that caused the ionization.

Finally, multiple sets of the anode/cathode/and dielectric material can be configured 480 to ensure substantially 100% absorption of either a particular energy or a range of energies of x-rays. These sets can include, but are not limited to, parallel configuration of inter-digitated, cone-like structures, wherein the dielectric thickness between electrodes varies with position along either electrode, and wherein the cone-like structures act to increase the local electric field to enhance charge transport and collection. Although the invention has been described and illustrated with a certain degree of particularity it is understood that the present disclosure has been made only by way of example and that numerous changes in the combination and arrangement of parts can be resorted to by those skilled in the art without departing from the spirit and scope of the invention, as is hereafter described in the following claims.

I claim:

1. A direct conversion radiation detector, comprising:
   at least two electrode plates orientated parallel to each other defining a set of electrode plates wherein for each set of electrode plates a first plate is a cathode comprising a material possessing an element with an atomic number≧26, and wherein a second plate is an anode; and
   a dielectric material interposed between the at least two electrode plates wherein absorption of ionizing radiation of a particular energy range by at least one of the at least two electrode plates produces secondary ionization in the dielectric material resulting in radiation induced conductivity of the dielectric material creating a measurable electric current when an external voltage is imposed between the anode and the cathode.

2. The direct conversion radiation detector of claim 1 wherein the ionizing radiation comprises x-rays.

3. The direct conversion radiation detector of claim 1 wherein energetic charged particle(s) produced by absorption or inelastic scattering of x-rays in the set of electrode plates can escape said set of electrode plates producing ionization in the dielectric material.

4. The direct conversion radiation detector of claim 1 wherein a minimum thickness of the dielectric material is equal to or larger than a continuous slowing down approximation range of energetic charged particle(s) in the dielectric material, said energetic charged particle(s) having been produced by absorption or inelastic scattering of an x-ray in either the cathode or the anode.

5. The direct conversion radiation detector of claim 1 wherein the anode and the cathode comprise material that is identical.

6. The direct conversion radiation detector of claim 1 wherein the dielectric material comprising a material possessing an element with an atomic number≧26, including lead, tellurium, or gadolinium.

7. The direct conversion radiation detector of claim 1 further comprising a third electrode plate wherein the third plate is a cathode positioned parallel with respect to the first plate and the second plate so as to place the first plate between the second plate and the third plate, and wherein the dielectric material is interposed between the first plate and the second plate and between the first plate and the third plate.

8. The direct conversion radiation detector of claim 1 wherein each set of electrode plates is orientated normal to the incident ionizing radiation.

9. The direct conversion radiation detector of claim 8 wherein a plurality of sets of electrode plates are configured adjacent to one another normal to an incident ionizing radiation beam and wherein anode and/or cathode thickness and dielectric material thickness of each successive set of electrode plates is larger than previous sets of electrode plates.

10. The direct conversion radiation detector of claim 8 wherein the at least two electrode plates are flat plate electrodes and wherein a plurality of detector pixels are defined by a septum formed by parallel pairs of the flat plate electrodes, said flat plate electrodes being perpendicular to the anodes and cathodes, and wherein the dielectric material is interposed between said pairs of such flat plate electrodes, said electrodes being biased to a single electrical potential such that current flow between any two such flat plate electrodes is prevented.

11. The direct conversion radiation detector of claim 10 wherein the flat plate electrodes defining the septum between pixels are biased to an anode potential, and wherein an anode oriented perpendicular to said electrode plates is adjacent to said electrode plates, and wherein a region adjacent to such electrode plates defining the septa is void of a cathode.

12. The direct conversion radiation detector of claim 8 wherein the detector comprises a plurality of layers of sets of electrode plates, each layer being parallel to an incident ionization beam and each set within each layer being offset in a direction normal to the incident ionization radiation.

13. The direct conversion radiation detector of claim 1 wherein radiation energies for the particular energy range are from approximately 1 keV to approximately 200 keV.

14. The direct conversion radiation detector of claim 1 wherein each set of electrode plates is orientated parallel to incident ionizing radiation.

15. The direct conversion radiation detector of claim 1 wherein a maximum thickness of the cathode or anode is less than a continuous slowing down approximation range of charged particle(s) produced by absorption or inelastic scattering of an x-ray of the particular energy range in the cathode or anode.

16. The direct conversion radiation detector of claim 1 wherein at least one of the at least two electrode plates is a flat plate configured with a plurality of polyhedron adjacent to said flat plate, said plurality of polyhedron having a composition identical to said flat plate composition, wherein said polyhedra is arranged in an array such that there is a gap between any two polyhedra, said gap filled with dielectric material.

17. The direct conversion radiation detector of claim 16 wherein both the cathode and the anode are configured with said plurality of polyhedra, and wherein orientation of the anode with respect to the cathode is such that the plurality of polyhedra adjacent to the anode are interdigitated with the plurality of polyhedra adjacent to the cathode, and wherein the space between the cathode, or any polyhedron adjacent to the cathode, and the anode, or any polyhedron adjacent to the anode, is filled with dielectric material.

18. The direct conversion radiation detector of claim 17 wherein the plurality of polyhedra adjacent to both anode and cathode are of a shape chosen from a list consisting of rectangular parallelpiped, pyramid and prism.

19. The direct conversion radiation detector of claim 17 wherein the plurality of polyhera adjacent to both cathode and anode are replaced with a plurality of either a right circular cone or right circular cylinder.

20. A method for converting ionizing radiation directly to an electrical current, the method comprising:
  configuring at least two electrode plates parallel to each other defining a set of electrode plates wherein for each set of electrode plates a first plate is a cathode comprising a material possessing an element with an atomic number$\geq$26 and a second plate is an anode;
  separating the at least two electrode plates with a dielectric material; and
  producing secondary ionization in the dielectric material by absorbing x-ray radiation of a particular energy range in at least one of the at least two electrode plates, wherein a charged particle(s) resulting from absorption or inelastic scattering of x-ray radiation produces secondary ionization in the dielectric resulting in radiation induced conductivity of said dielectric material, and wherein a measurable electric current is produced when an external voltage is imposed between the anode and the cathode.

21. The method for converting ionizing radiation directly to an electrical current of claim 20 wherein a thickness of either the cathode and/or anode produces energetic charged particle(s) in the detector by absorption or inelastic scattering of x-rays in the set of electrode plates of the detector, and wherein said energetic charged particle(s) escape said set of electrode plates producing ionization in the dielectric material.

22. The method for converting ionizing radiation directly to an electrical current of claim 20 wherein a minimum thickness of the dielectric material is equal to or larger than a maximum continuous slowing down approximation range of energetic charged particle(s) produced by absorption or inelastic scattering of an x-ray in either the cathode or the anode in the dielectric material.

23. The method for converting ionizing radiation directly to an electrical current of claim 20 further comprising orientating a plurality of sets of electrode plates configured adjacent to one another normal to an incident radiation beam and wherein anode and/or cathode thickness and dielectric material thickness of each successive set of electrode plates is larger than previous sets of electrode plates.

24. The method for converting ionizing radiation directly to an electrical current of claim 20 further comprising orientating a plurality of layers of sets of electrode plates, each layer being parallel to an incident radiation beam and wherein each set of electrode plates is offset in a direction normal to the incident radiation beam.

\* \* \* \* \*